United States Patent Office 3,074,936
Patented Jan. 22, 1963

3,074,936
17α(2'-CARBOXYETHYL)-Δ³,⁵-ANDROSTADIEN-17β-OL-LACTONE DERIVATIVES
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Jan. 17, 1962, Ser. No. 166,947
17 Claims. (Cl. 260—239.57)

The present invention relates to novel cyclopentanophenanthrene derivatives and to a process for the production thereof.

More particularly the present invention relates to novel 17α - (2' - carboxyethyl)-Δ³,⁵-androstadien-17β-ol-lactone derivatives.

The novel compounds of the present invention which exhibit anabolic, anti-estrogenic and anti-gonadotrophic activities are represented by the following formula:

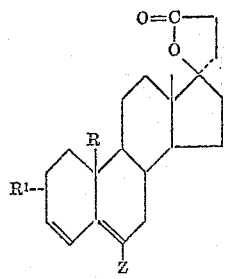

In the above formula R and R¹ represent hydrogen or methyl, and Z represents hydrogen, fluorine, chlorine or methyl.

The novel 2,6-unsubstituted compounds of the present invention are prepared by the process exemplified as follows:

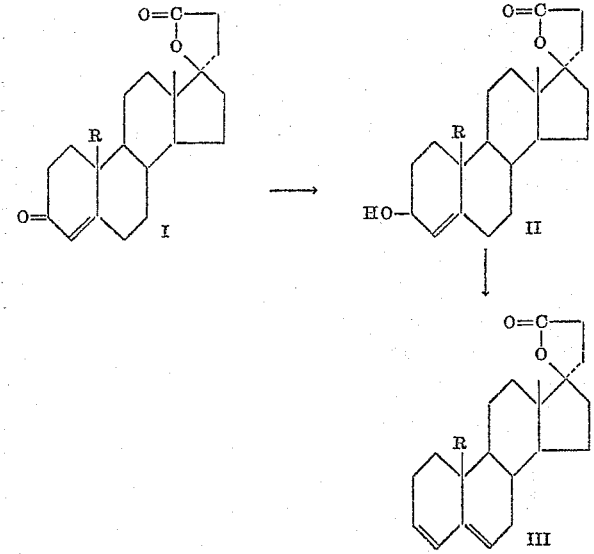

In the above formulas R has the above defined meaning.

In practicing the process just outlined, the starting compound which is 17α-(2'-carboxyethyl)-Δ⁴-androsten-17β-ol-3-one-lactone or the 19-nor derivative thereof (I) is reduced, preferably with sodium borohydride, thus affording the corresponding 3β-hydroxy-Δ⁴-androstene derivative (II) which upon treatment in an acid medium, preferably 50% acetic acid, at steam bath temperature for a period of time of the order of 1 hour, yields the respective Δ³,⁵-androstadiene-17-spirolactone compound (III).

The novel 2-unsubstituted-6-halo compounds of the present invention may be prepared by the process exemplified by the following equation:

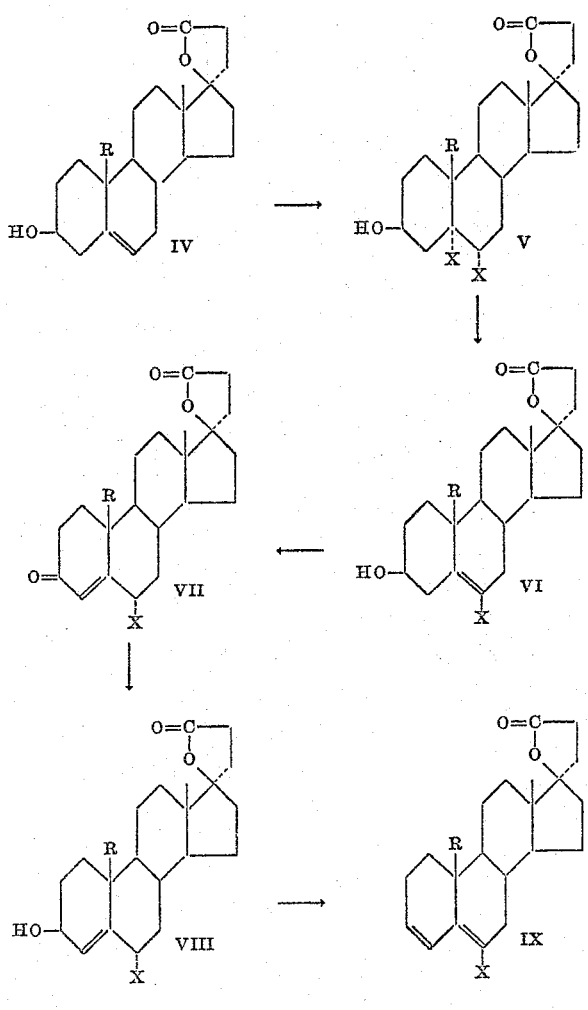

In the above formulas R has the same meaning as heretofore set forth, and X represents fluorine or chlorine.

In practicing the above outlined process, the starting compound, which is 17α-(2'-carboxyethyl)-Δ⁵-androsten-3β,17β-diol-lactone or the 19-nor derivative thereof (IV) is treated with phenyl iodoso dichloride or difluoride to give the respective 5α, 6α-dichloro or difluoro derivative (V) which upon treatment with a dehydrohalogenating agent, preferably calcium carbonate in dimethyl formamide, yields the corresponding 6-halo-17α-(2'-carboxyethyl)-Δ⁵-androstene-3β,17β-diol-lactone (VI). The latter compound is oxidized preferably with chromic acid to produce the corresponding 3-keto-Δ⁴-androstene derivative (VII) which upon reduction preferably with sodium borohydride, affords the respective 3β-hydroxy-Δ⁴-androstene compound (VIII). The latter is treated with an acid, such as 50% acetic acid, to form the corresponding 6 - halo-17α-(2'-carboxyethyl)-Δ³,⁵-androstadien-17β-ol-lactone (IX).

The 2-unsubstituted-6-methyl derivatives of the present invention are produced by the process illustrated by the following equation:

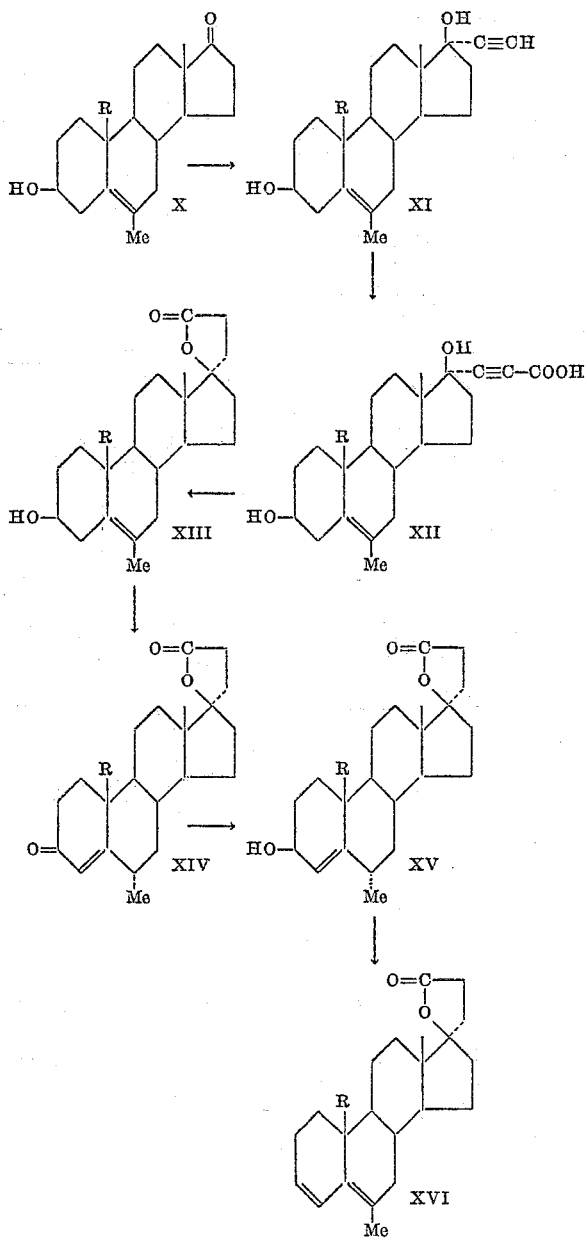

In the above formulas R has the same meaning as heretofore set forth.

In practicing the process just outlined, the starting 6-methyl-Δ⁵-androsten-3β-ol-17-one or the 19-nor derivative thereof (X) is treated with acetylene in the presence of an alkali metal lower alkoxide, preferably potassium t-amylate, to form the corresponding 6-methyl-17α-ethynyl-Δ⁵-androstene-3β,17β-diol (XI) which upon treatment with a methyl magnesium halide, preferably the bromide, followed by reaction with carbon dioxide yields the corresponding 6-methyl-17α-(2'-carboxyethynyl)-Δ⁵-androstene-3β,17β-diol (XII). The latter compound upon absorption of two molar equivalents of hydrogen in the presence of a suitable catalyst, such as 5% palladium on carbon yields the respective 6-methyl-17α-(2'-carboxyethyl)-Δ⁵-androstene-3β,17β-diol-lactone (XIII). Oxidation, preferably with chromic acid, yields the corresponding 3-keto-Δ⁴-androstene derivative (XIV), which upon reduction, preferably with sodium borohydride, affords the respective 3β-hydroxy-Δ⁴-androstene compound (XV). The latter is treated with an acid, such as 50% acetic acid, to produce the corresponding 6-methyl-17α-(2' - carboxyethyl) - Δ³,⁵ - androstadien - 17β-ol-lactone (XVI).

The 2-methyl compounds of the present invention may be prepared by the method exemplified by the following equation:

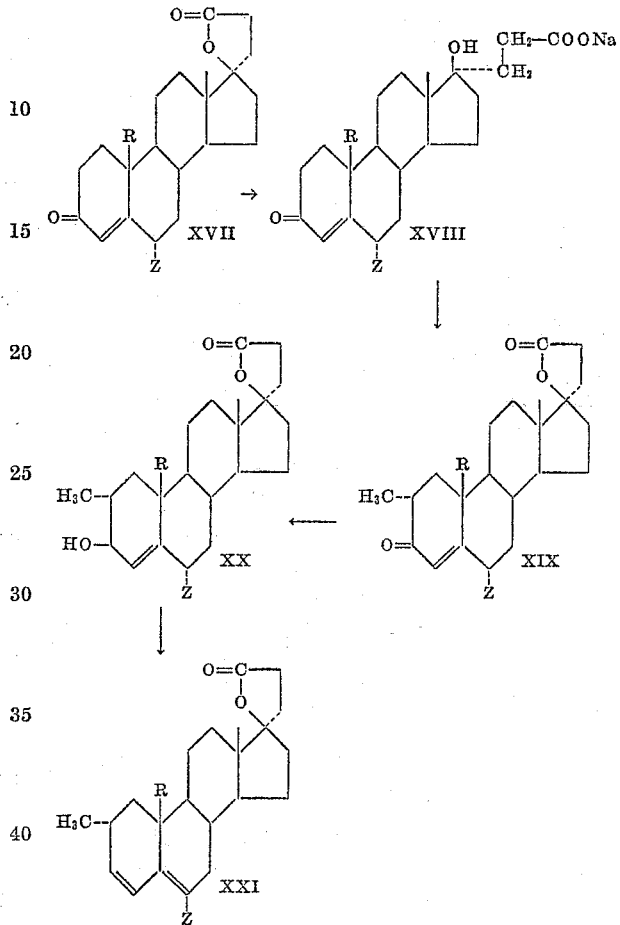

In the above formulas R and Z have the same meaning as previously set forth.

In practicing the above outlined process, the starting compound which is a 17α-(2'-carboxyethyl)-Δ⁴-androsten-17β-ol-3-one-lactone compound or the 19-nor derivative thereof (XVII) is treated with an alkali metal hydroxide, thus opening the lactone ring and affording the sodium salt of the corresponding 17α-(2'-carboxyethyl)-Δ⁴-androsten-17β-ol-3-one (XVIII). The latter compound upon reaction with ethyl formate in the presence of sodium hydride, followed by acid treatment of the double sodium salt of the resulting 2-hydroxymethylene-17α-(2'-carboxyethyl) derivative yields the corresponding free 2-hydroxymethylene-17-spirolactone, which after absorption of 2 molar equivalents of hydrogen in the presence of a suitable catalyst, preferably 10% palladium on carbon, furnishes the corresponding 2α-methyl-17α-(2' - carboxyethyl) - Δ⁴ - androsten-17β-ol-3-one lactone (XIX). Reduction of the 3-keto group of the latter compound, preferably with sodium borohydride, yields the corresponding 3β-hydroxy-Δ⁴-androstene derivative (XX) which upon acid treatment, preferably with 50% acetic acid affords the corresponding 2α-methyl-17α-(2'-carboxyethyl)-Δ³,⁵-androstadien-17β-ol-lactone derivative (XXI).

The following specific examples serve to illustrate but are not intended to limit the scope of the present invention:

PREPARATION 1

A solution of 5 g. of 6α-methyl-Δ⁴-androsten-17β-ol-3-one (Ringold et al., U.S.P. application Serial No. 643,550, filed March 4, 1957), in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3,17β-diacetoxy-6-methyl-Δ$^{3,5}$-androstadiene.

A solution of 4 g. of sodium borohydride in 60 cc. of methanol was added with stirring to a solution of 4 g. of the above compound in 80 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 6-methyl-Δ$^5$-androstene-3β,17β-diol-17-acetate.

6 cc. of dihydropyrane were added to a solution of 3 g. of the foregoing compound in 45 cc. of benzene and about 3 cc. was distilled to remove moisture. 1.2 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 6-methyl-Δ$^5$-androstene-3β,17β-diol-17-acetate.

A suspension of 1 g. of the above ether in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 3-tetrahydropyranylether of 6-methyl-Δ$^5$-androstene-3β,17β-diol.

A solution of 6 g. of the latter compound (resulting from the combined products of several experiments) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded the 3-tetrahydropyranylether of 6-methyl-Δ$^5$-androsten-3β-ol-17-one.

To a solution of 5 g. of the foregoing tetrahydropyranylether in 130 cc. of acetic acid was added 2.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 6-methyl-Δ$^5$-androsten-3β-ol-17-one.

Following the above procedure 6α-methyl-19-nortestosterone (Djerassi et al., U.S.P. appl. Ser. No. 843,938, filed October 2, 1959) was successively converted into 3,17β-diacetoxy-6-methyl-19-nor-Δ$^{3,5}$-androstadiene; 6-methyl-19-nor-Δ$^5$-androstene-3β,17β-diol-17-acetate; the 3-tetrahydropyranylether of 6-methyl-19-nor-Δ$^5$-androstene-3β,17β-diol-17-acetate; the 3-tetrahydropyranylether of 6-methyl-19-nor-Δ$^5$-androstene-3β,17β-diol; the 3-tetrahydropyranylether of 6-methyl-19-nor-Δ$^5$-androsten-3β-ol-17-one; and 6-methyl-19-nor-Δ$^5$-androsten-3β-ol-17-one.

Example I

A mixture of 2.5 g. of 17α-(2'-carboxyethyl)-Δ$^5$-androstene-3β,17β-diol lactone (Cella et al., J. Org. Chem. 24, 743 (1959)), 1.05 mol. equivalents of phenyl iodoso dichloride and 100 cc. of chloroform was refluxed until the crystals of the reagent disappeared. The solvents were removed and the residue recrystallized from chloroform-ethyl acetate thus yielding 5α,6α-dichloro-17α-(2'-carboxyethyl)-androstane-3β,17β-diol lactone.

By the same procedure there was treated 17α-(2'-carboxyethyl)-19-nor-Δ$^5$-androstene-3β,17β-diol lactone (obtained in accordance with our copending U.S.P. appl. Ser. No. 166,951 filed of even date) thus giving 5α,6α-dichloro-17α-(2'-carboxyethyl)-19-nor-androstane-3β,17β-diol lactone.

Example II

17α-(2'-carboxyethyl)-Δ$^5$-androstene-3β,17β-diol lactone and 17α-(2'-carboxyethyl)-19-nor-Δ$^5$-androstene-3β,17β-diol lactone were treated in accordance with the preceding example, except that penyl iodoso dichloride was substituted by phenyl iodoso difluoride, thus giving 5α,6α-difluoro-17α-(2'-carboxyethyl)-androstane-3β,17β-diol lactone and 5α,6α-difluoro-17α-(2'-carboxyethyl)-19-nor-androstane-3β,17β-diol lactone.

Example III 2 g. of 5α,6α-dichloro-17α-(2'-carboxyethyl)-androstane-3β,17β-diol lactone in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 6-chloro-17α-(2'-carboxyethyl)-Δ$^5$-androstene-3β,17β-diol lactone.

When applying the above procedure to 5α,6α-dichloro-17α-(2'-carboxyethyl)-19-nor-androstane-3β,17β-diol lactone, 5α,6α-difluoro-17α-(2'-carboxyethyl)-19-nor-androstane-3β,17β-diol lactone, and 5α,6α-difluoro-17α-(2'-carboxyethyl)-androstane-3β,17β-diol lactone there were respectively obtained 6-chloro-17α-(2'-carboxyethyl)-19-nor-Δ$^5$-androstene-3β,17β-diol lactone, 6-fluoro-17α-(2'-carboxyethyl)-19-nor-Δ$^5$-androstene-3β,17β-diol lactone and 6-fluoro-17α-(2'-carboxyethyl)-Δ$^5$-androstene-3β,17β-diol lactone.

Example IV

A solution of 1.1 equivalents of chromic acid in 5 cc. of 80% acetic acid was added dropwise to a stirred solution of 1 g. of 6-chloro-17α-(2'-carboxyethyl)-Δ$^5$-androstene-3β,17β-diol lactone in 10 cc. of glacial acetic acid, while the temperature was maintained around 20° C. After 2 hours at room temperature, the mixture was poured into ice water and the formed precipitate collected, washed with water and recrystallized from methanol, thus giving 6α-chloro-17α-(2'-carboxyethyl)-Δ$^4$-androsten-17β-ol-3-one lactone.

By the same procedure there were treated: 6-chloro-17α-(2'-carboxyethyl)-19-nor-Δ$^5$-androstene-3β,17β-diol lactone, 6-fluoro-17α-(2'-carboxyethyl)-19-nor-Δ$^5$-androstene-3β,17β-diol lactone, and 6-fluoro-17α-(2'-carboxyethyl)-Δ$^5$-androstene-3β,17β-diol lactone, giving respectively: 6α-chloro-17α-(2'-carboxyethyl)-19-nor-Δ$^4$-androsten-17β-ol-3-one lactone, 6α-fluoro-17α-(2'-carboxyethyl)-19-nor-Δ$^4$-androsten-17β-ol-3-one lactone and 6α-fluoro-17α-(2'-carboxyethyl)-Δ$^4$-androsten-17β-ol-3-one lactone.

Example V

A solution of 1 g. of sodium borohydride in 3 cc. of water was added to an ice-cooled solution of 1 g. of 6α-chloro-17α-(2'-carboxyethyl)-Δ$^4$-androsten-17β-ol-3-one lactone in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 6α-chloro-17α-(2'-carboxyethyl)-Δ$^4$-androsten-3β,17β-diol lactone.

When applying the foregoing method to: 6α-chloro-17α-(2'-carboxyethyl)-19-nor-Δ⁴-androsten-17β-ol - 3 - one lactone, 6α-fluoro-17α-(2'-carboxyethyl)-19-nor-Δ⁴-androsten-17β-ol-3-one lactone and 6α-fluoro-17α-(2'-carboxyethyl)-Δ⁴-androsten-17β-ol-3-one lactone, there were correspondingly obtained 6α-chloro-17α-(2'-carboxyethyl)-19-nor-Δ⁴-androsten-3β,17β-diol lactone, 6α-fluoro-17α-(2'-carboxyethyl)-19-nor-Δ⁴-androsten-3β,17β-diol lactone, and 6α-fluoro-17α-(2'-carboxyethyl)-Δ⁴-androsten-3β,17β-diol lactone.

*Example VI*

1 g. of 6α-chloro-17α-(2'-carboxyethyl)-Δ⁴-androsten-3β,17β-diol lactone was heated on the steam bath with 100 cc. of 50% acetic acid under nitrogen for 1 hour, it was then concentrated under vacuum to a small volume and poured into water. The precipitate was collected, washed well with water, dried and recrystallized from acetone-hexane, thus furnishing 6-chloro-17α-(2'-carboxyethyl)-Δ³,⁵-androstadien-17β-ol lactone.

By the same procedure there were treated: 6α-chloro-17α-(2'-carboxyethyl)-19-nor-Δ⁴-androsten-3β,17β-diol lactone, 6α-fluoro-17α-(2'-carboxyethyl)-19-nor-Δ⁴-androsten-3β,17β-diol lactone, and 6α-fluoro-17α-(2'-carboxyethyl)-Δ⁴-androsten-3β,17β-diol lactone, giving respectively: 6-chloro-17α-(2'-carboxyethyl)-19-nor-Δ³,⁵-androstadien-17β-ol lactone, 6-fluoro-17α-(2'-carboxyethyl)-19-nor-Δ³,⁵-androstadien-17β-ol lactone and 6-fluoro-17α-(2'-carboxyethyl)-Δ³,⁵-androstadien-17β-ol lactone.

*Example VII*

A solution of 1 g. of 6-methyl-Δ⁵-androsten-3β-ol-17-one (obtained according to Preparation 1) in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 6-methyl-17α-ethinyl-Δ⁵-androstene-3β,17β-diol.

*Example VIII*

A solution of 1 g. of the foregoing steroid in 10 cc. of anhydrous tetrahydrofuran was added to a refluxing solution of 6 cc. of 3 M. methyl magnesium bromide in 15 cc. of tetrahydrofuran. The resulting suspension was stirred and refluxed for 24 hours. A slight positive pressure of carbon dioxide was then maintained over the stirred mixture for approximately 24 hours. The mixture was thereafter poured into ice cold 0.2 M. sulfuric acid and most of the solvent removed by vacuum distillation. The crude precipitated product was filtered off, washed with water to neutral and dried. Recrystallization from acetone-hexane afforded 6-methyl-17α-(2'-carboxyethinyl)-Δ⁵-androstene-3β,17β-diol.

*Example IX*

A suspension of 0.5 g. of 5% palladium on carbon catalyst in 50 cc. of methanol was hydrogenated for 30 minutes. A solution of 2 g. of the latter compound in 200 cc. of methanol was added to the catalyst and stirred under a hydrogen atmosphere until the uptake of hydrogen ceased. After removal of the catalyst by filtration the solution was evaporated and the crude residue was purified by crystallization from methylene chloride-hexane, thus giving 6-methyl-17α-(2'-carboxyethyl)-Δ⁵-androstene-3β,17β-diol lactone.

*Example X*

The foregoing compound was treated following the procedure described in Example IV, thus furnishing 6α-methyl-17α-(2'-carboxyethyl) - Δ⁴ - androsten - 17β-ol-3-one lactone.

*Example XI*

The above steroid was reduced in accordance with Example V to give 6α-methyl-17α - (2'-carboxyethyl)-Δ⁴-androstene-3β,17β-diol lactone.

*Example XII*

The preceding compound was treated according to Example VI, thus yielding 6-methyl-17α-(2'-carboxyethyl)-Δ³,⁵-androstadiene-17β-ol lactone.

*Example XIII*

6-methyl-19-nor-Δ⁵-androsten-3β,ol-17-one (obtained in accordance with Preparation 1) was successively treated in accordance with Examples VII, VIII, IX, X, XI and XII, thus being consecutively transformed into:

6-methyl-17α-ethinyl-19-nor-Δ⁵-androstene-3β,17β-diol,
6-methyl-17α-(2'-carboxyethinyl)-19-nor-Δ⁵-androstene-3β,17β-diol,
6-methyl-17α-(2'-carboxyethyl)-19-nor-Δ⁵-androstene-3β,17β-diol lactone,
6α-methyl-17α-(2'-carboxyethyl)-19-nor-Δ⁴-androstene-17β-ol-3-one lactone,
6α-methyl-17α-(2'-carboxyethyl)-19-nor-Δ⁴-androstene-3β,17β-diol lactone,
and 6-methyl-17α-(2'-carboxyethyl)-19-nor-Δ³,⁵-androstadien-17β-ol lactone.

*Example XIV*

17α-(2'-carboxyethyl)-Δ⁴-androsten - 17β-ol-3-one lactone and 17α-(2'-carboxyethyl) - 19-nor - Δ⁴-androsten-17β-ol-3-one lactone (Cella et al., v. supra) were treated according to the procedure described in Example V, thus giving respectively: 17α-(2'-carboxyethyl)-Δ⁴-androstene-3β,17β-diol lactone and 17α-(2'-carboxyethyl-19-nor-Δ⁴-androstene-3β,17β-diol lactone.

*Example XV*

The two foregoing compounds were treated in accordance with Example VI thus yielding: 17α-(2'-carboxyethyl)-Δ³,⁵-androstadien-17β-ol lactone and 17α-(2'-carboxyethyl)-19-nor-Δ³,⁵-androstadien-17β-ol lactone.

*Example XVI*

A solution of 1 g. of 17α-(2'-carboxyethyl)-Δ⁴-androsten-17β-ol-3-one lactone in 50 cc. of methanol was refluxed for 3 hours with 500 mg. of potassium hydroxide dissolved in 1 cc. of water; it was then poured into ice water, the precipitate collected, washed with water to neutral and dried, thus producing a crude compound which upon recrystallization from methylene - chloride-ether afforded the sodium salt of 17α-(2'-carboxyethyl)-Δ⁴-androsten-17β-ol-3-one.

When applying the above procedure to the starting compounds under I, there were obtained the products under II:

| I | II |
|---|---|
| 6α-chloro-17α-(2'-carboxyethyl)-Δ⁴-androsten-17β-ol-3-one lactone. | The sodium salt of 6α-chloro-17α-(2'-carboxyethyl)-Δ⁴-androsten-17β-ol-3-one. |
| 6α-fluoro-17α-(2'-carboxyethyl)-Δ⁴-androsten-17β-ol-3-one lactone. | The sodium salt of 6α-fluoro-17α-(2'-carboxyethyl)-Δ⁴-androsten-17β-ol-3-one. |
| 6α-methyl-17α-(2'-carboxyethyl)-Δ⁴-androsten-17β-ol-3-one lactone. | The sodium salt of 6α-methyl-17α-(2'-carboxyethyl)-Δ⁴-androsten-17β-ol-3-one. |
| 17α-(2'-carboxyethyl)-19-nor-Δ⁴-androsten-17β-ol-3-one lactone. | The sodium salt of 17α-(2'-carboxyethyl)-Δ⁴-androsten-17β-ol-3-one. |
| 6α-chloro-17α-(2'-carboxyethyl)-19-nor-Δ⁴-androsten-17β-ol-3-one lactone. | The sodium salt of 6α-chloro-17α-(2'-carboxyethyl)-19-nor-Δ⁴-androsten-17β-ol-3-one. |
| 6α-fluoro-17α-(2'-carboxyethyl)-19-nor-Δ⁴-androsten-17β-ol-3-one lactone. | The sodium salt of 6α-fluoro-17α-(2'-carboxyethyl)-19-nor-Δ⁴-androsten-17β-ol-3-one. |
| 6α-methyl-17α-(2'-carboxyethyl)-19-nor-Δ⁴-androsten-17β-ol-3-one lactone. | The sodium salt of 6α-methyl-17α-(2'-carboxyethyl)-19-nor-Δ⁴-androsten-17β-ol-3-one. |

Example XVII

A mixture of 5 g. of the sodium salt of 17α-(2'-carboxyethyl)-Δ⁴-androsten-17β-ol-3-one (obtained according to Example XVI) in 40 cc. of anhydrous thiophene-free benzene, 2 cc. of ethyl formate and 1.5 g. of sodium hydride was stirred for 24 hours under nitrogen. The double sodium salt of the resulting 2-hydroxymethylene-17α-(2'-carboxyethyl) derivative and the excess hydride were filtered off, washed with benzene, then hexane and dried in vacuo. Cautious precipitation in excess ice-cold dilute hydrochloric acid gave the crude free 2-hydroxymethylene - 17 - spirolactone derivative which was filtered off, washed with water and air-dried, 1 g. of the product was hydrogenated for approximately 24 hours in 15 cc. of methanol over 0.4 g. of prehydrogenated 10% palladium carbon catalyst at 25° C. and 570 mm. pressure until two moles of hydrogen were taken up. The mixture was filtered, the catalyst washed with hot methanol and the combined solutions evaporated to dryness. Crystallization from acetone-hexane yielded 2α-methyl-17α-(2'-carboxyethyl-Δ⁴ - androsten - 17β-ol-3-one lactone.

Example XVIII

By the foregoing procedure were treated the rest of the sodium salts obtained in Example XVI, giving respectively:

2α-methyl-6α-chloro-17α-(2'-carboxyethyl)-Δ⁴-androsten-17β-ol-3-one lactone,

2α-methyl-6α-fluoro-17α-(2'-carboxyethyl)-Δ⁴-androsten-17β-ol-3-one lactone,

2α,6α-dimethyl-17α-(2'-carboxyethyl)-Δ⁴-androsten-17β-ol-3-one lactone,

2α-methyl-17α-(2'-carboxyethyl)-19-nor-Δ⁴-androsten-17β-ol-3-one lactone,

2α-methyl-6α-chloro-17α-(2'-carboxyethyl)-19-nor-Δ⁴-androsten-17β-ol-3-one lactone, 2α-methyl-6α-fluoro-17α-(2'-carboxyethyl)-19-nor-Δ⁴-androsten-17β-ol-3-one lactone, and 2α,6α-dimethyl-17α-(2'-carboxyethyl)-19-nor-Δ⁴-androsten-17β-ol-3-one lactone.

Example XIX

2α-methyl-17α - (2'-carboxyethyl) - Δ⁴-androsten-17β-ol-3-one lactone was treated in accordance with Example V, to give: 2α-methyl-17α-(2'-carboxyethyl)-Δ⁴-androsten-3β,17β-diol lactone.

By the same procedure there were treated the lactones obtained in the preceding example, thus giving respectively:

2α-methyl-6α-chloro-17α-(2'-carboxyethyl)-Δ⁴-androsten-3β,17β-diol lactone,

2α-methyl-6α-fluoro-17α-(2'-carboxyethyl)-Δ⁴-androsten-3β,17β-diol lactone,

2α,6α-dimethyl-17α-(2'-carboxyethyl)Δ⁴-androsten-3β,17β-diol lactone,

2α-methyl-17α-(2'-carboxyethyl)-19-nor-Δ⁴-androsten-3β,17β-diol lactone,

2α-methyl-6α-chloro-17α-(2'-carboxyethyl)-19-nor-Δ⁴-androsten-3β,17β-diol lactone, 2α-methyl-6α-fluoro-17α-(2'-carboxyethyl)-19-nor-Δ⁴-androsten-3β,17β-diol lactone, and 2α,6α-dimethyl-17α-(2'-carboxyethyl)-19-nor-Δ⁴-androsten-3β,17β-diol lactone.

Example XIX

2α - methyl - 17α - (2' - carboxyethyl) - Δ⁴ - androstene-3β,17β-diol lactone was treated following the procedure described in Example VI, thus giving 2α-methyl-17α-(2'-carboxyethyl)-Δ³,⁵-androstadien-17β-ol lactone.

Following the same procedure were treated the starting compounds under I, to give the corresponding products under II.

| I | II |
|---|---|
| 2α-methyl-6α-chloro-17α-(2'-carboxyethyl)-Δ⁴-androsten-3β,17β-diol lactone. | 2α-methyl-6-chloro-17α-(2'-carboxyethyl)-Δ³,⁵-androstadien-17β-ol lactone. |
| 2α-methyl-6α-fluoro-17α-(2'-carboxyethyl)-Δ⁴-androsten-3β,17β-diol lactone. | 2α-methyl-6-fluoro-17α-(2'-carboxyethyl)-Δ³,⁵-androstadien-17β-ol lactone. |
| 2α,6α-dimethyl-17α-(2'-carboxyethyl)-Δ⁴-androsten-3β,17β-diol lactone. | 2α,6-dimethyl-17α-(2'-carboxyethyl)-Δ³,⁵-androstadien-17β-ol lactone. |
| 2α-methyl-17α-(2'-carboxyethyl)-19-nor-Δ⁴-androsten-3β,17β-diol lactone. | 2α-methyl-17α-(2'-carboxyethyl)-19-nor-Δ³,⁵-androstadien-17β-ol-lactone. |
| 2α-methyl-6α-chloro-17α-(2'-carboxyethyl)-19-nor-Δ⁴-androsten-3β,17β-diol lactone. | 2α-methyl-6-chloro-17α-(2'-carboxyethyl)-19-nor-Δ³,⁵-androstadien-17β-ol lactone. |
| 2α-methyl-6α-fluoro-17α-(2'-carboxyethyl)-19-nor-Δ⁴-androsten-3β,17β-diol lactone. | 2α-methyl-6-fluoro-17α-(2'-carboxyethyl)-19-nor-Δ³,⁵-androstadien-17β-ol lactone. |
| 2α,6α-dimethyl-17α-(2'-carboxyethyl)-19-nor-Δ⁴-androsten-3β,17β-diol lactone. | 2α,6-dimethyl-17α-(2'-carboxyethyl)-19-nor-Δ³,⁵-androstadien-17β-ol lactone. |

We claim:

1. A compound of the following formula:

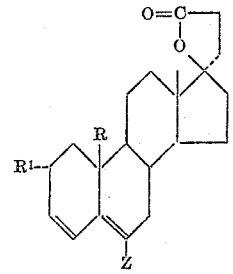

wherein R and R¹ are selected from the group consisting of hydrogen and methyl; Z is a member of the group consisting of hydrogen, fluorine, chlorine and methyl.

2. 17α - (2' - carboxyethyl) - Δ³,⁵ - androstadien - 17β-ol-lactone.

3. 17α - (2' - carboxyethyl) - 19 - nor - Δ³,⁵ - androstadien-17β-ol-lactone.

4. 6 - chloro - 17α - (2' - carboxyethyl) - Δ³,⁵ - androstadien-17β-ol-lactone.

5. 6 - chloro - 17α - (2' - carboxyethyl) - 19 - nor-Δ³,⁵-androstadien-17β-ol-lactone.

6. 6 - fluoro - 17α - (2' - carboxyethyl) - Δ³,⁵ - androstadien-17β-ol-lactone.

7. 6 - fluoro - 17α - (2' - carboxyethyl) - 19 - nor - Δ³,⁵-androstadien-17β-ol-lactone.

8. 6 - methyl - 17α - (2' - carboxyethyl) - Δ³,⁵ - androstadien-17β-ol-lactone.

9. 6 - methyl - 17α - (2' - carboxyethyl) - 19 - nor-Δ³,⁵-androstadien-17β-ol-lactone.

10. 2α - methyl - 17α - (2' - carboxyethyl) - Δ³,⁵ - androstadien-17β-ol-lactone.

11. 2α - methyl - 17α - (2' -carboxyethyl) - 19 - nor-Δ³,⁵-androstadien-17β-ol-lactone.

12. 2α - methyl - 6 - chloro - 17α - (2' - carboxyethyl)-Δ³,⁵-androstadien-17β-ol-lactone.

13. 2α - methyl - 6 - chloro - 17α - (2' - carboxyethyl)-19-nor-Δ³,⁵-androstadien-17β-ol-lactone.

14. 2α - methyl - 6- fluoro - 17α - (2' - carboxyethyl)-Δ³,⁵-androstadien-17β-ol-lactone.

15. 2α - methyl - 6 - fluoro - 17α - (2' - carboxyethyl)-19-nor-Δ³,⁵-androstadien-17β-ol-lactone.

16. 2α,6 - dimethyl - 17α - (2' - carboxyethyl) - Δ³,⁵-androstadien-17β-ol-lactone.

17. 2α,6 - dimethyl - 17α - (2' - carboxyethyl) - 19-nor-Δ³,⁵-androstadien-17β-ol-lactone.

No references cited.